US005692164A

United States Patent [19]
Pantelakis

[11] Patent Number: 5,692,164
[45] Date of Patent: Nov. 25, 1997

[54] METHOD AND APPARATUS FOR GENERATING FOUR PHASE NON-OVER LAPPING CLOCK PULSES FOR A CHARGE PUMP

[75] Inventor: Dimitris Pantelakis, Folsom, Calif.

[73] Assignee: Intel Corporation, Santa Clara, Calif.

[21] Appl. No.: 768,848

[22] Filed: Dec. 18, 1996

Related U.S. Application Data

[63] Continuation of Ser. No. 217,166, Mar. 23, 1994, abandoned.

[51] Int. Cl.$^6$ ........................................................ G06F 1/06
[52] U.S. Cl. .............................. 395/556; 327/296; 327/536
[58] Field of Search .................................. 395/555, 556; 327/239, 259, 296, 306, 526, 536; 377/78

[56] References Cited

U.S. PATENT DOCUMENTS

| | | |
|---|---|---|
| 5,140,182 | 8/1992 | Ichimura. |
| 5,157,278 | 10/1992 | Min et al.. |
| 5,216,588 | 6/1993 | Bajwa et al.. |
| 5,313,429 | 5/1994 | Chevallier et al.. |
| 5,410,465 | 4/1995 | Tan ............................................... 363/60 |
| 5,414,669 | 5/1995 | Tedrow et al. ........................... 365/226 |
| 5,422,586 | 6/1995 | Tedrow et al.. |
| 5,432,469 | 7/1995 | Tedrow et al.. |
| 5,436,587 | 7/1995 | Cernea ....................................... 327/536 |
| 5,509,134 | 4/1996 | Fandrich et al. ........................ 395/430 |

OTHER PUBLICATIONS

Miyawaki et al, "A New Erasing and Row Decoding Scheme for Low Supply Voltage Operation 16–Mb/64–Mb Flash Memories", IEEE Journal of Solid State Circuits, vol. 27, No. 4, Apr. 1992 pp. 583–587.

Umezawa et al, "A 5–V–Only Operation 0.6–um. Flash EEPROM with Row Decoder Scheme in Triple–Well Structure," IEEE Journal of Solid State Circuits, vol. 27, No. 11, Nov. 1992. pp. 1540–1545.

Jinbo et al, "A 5–V–Only 16–Mb Flash Memory with Sector Erase Mode", IEEE Journal of Solid State Circuits, vol. 27, No. 11, Nov. 1992, pp. 1547–1553.

*Primary Examiner*—Thomas M. Heckler
*Attorney, Agent, or Firm*—Blakely, Sokoloff, Taylor & Zafman

[57] ABSTRACT

A clock generation circuit which includes a first circuit for generating first and second trains of non-overlapping and opposite phase clock pulses from an input train of clock pulses, and second and third circuits each for generating a pair of non-overlapping and opposite phase trains of clock pulses from one of the first or second trains of opposite phase clock pulses provided by the first circuit.

16 Claims, 6 Drawing Sheets

METHOD AND APPARATUS FOR GENERATING FOUR PHASE NON-OVER LAPPING CLOCK PULSES FOR A CHARGE PUMP

This is a continuation of application Ser. No. 08/217,166, filed Mar. 23, 1994, now abandoned.

BACKGROUND OF THE INVENTION

1. Field Of The Invention

This invention relates to computer systems, and more particularly, to methods and apparatus for generating four different phases of non-overlapping clock pulses for driving a charge pump.

2. History Of The Prior Art

A charge pump is used to generate a high level of positive or negative voltage from a lower level. Such a pump includes a series of stages each of which functions in the nature of a diode arranged between interstage capacitors. A series of clock pulses are furnished to the pump for biasing the diode-like stages to pass current for charging the interstage capacitors to the appropriate levels. By applying clock signals in selected sequences to opposite sides of the diode-like stages, a charge on an interstage capacitor at the input to a stage may be transferred to an interstage capacitor at the output to a stage. The clock pulses act as sources of charge which gradually build to higher levels at each of the interstage capacitors until a desired output level is reached.

One form of charge pump utilizes four individual trains of non-overlapping clock pulses in order to provide very efficient operation. The individual pulses of these trains which are used to operate each stage of the charge pump are non-overlapping and very precisely related in order to provide the desired efficient operation. The generation of such trains of pulses has been quite difficult to accomplish using prior art techniques. It is therefore desirable to provide a new method and apparatus for generating these clock pulses accurately and reliably with a minimum number of components.

SUMMARY OF THE INVENTION

It is, therefore, an object of the present invention to provide reliably and simply a series of four trains of non-overlapping clock pulses which may be used to operate a charge pump.

It is another more specific object of the present invention to provide a method and apparatus for generating four trains of precisely interrelated non-overlapping clock pulses which may be used to operate a very efficient charge pump.

These and other objects of the present invention are realized in a clock generation circuit which includes a first circuit for generating first and second trains of non-overlapping clock pulses from an input train of clock pulses, and second and third circuits each for generating a pair of non-overlapping trains of clock pulses from one of the first or second trains of non-overlapping clock pulses provided by the first circuit.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
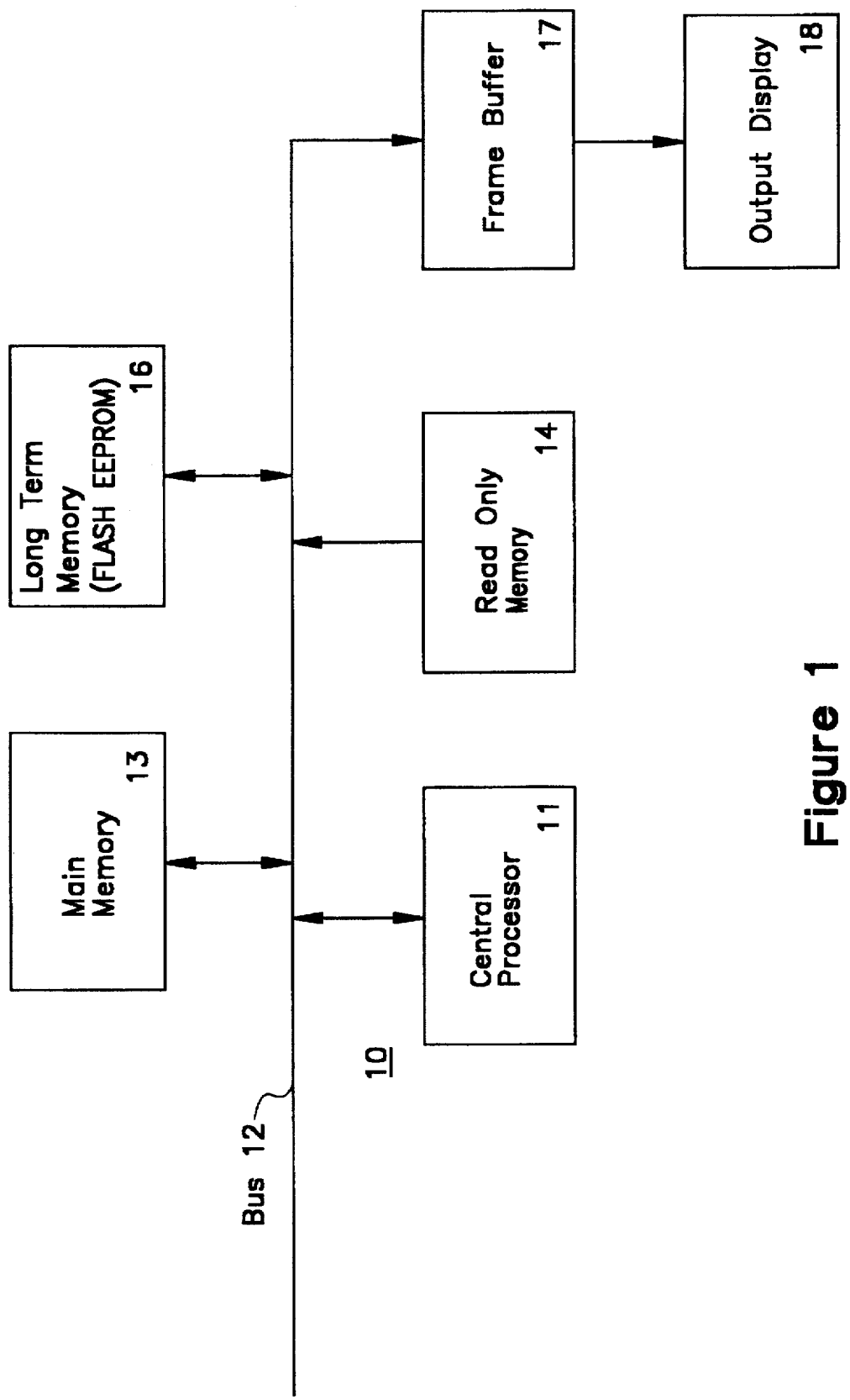
FIG. 1 is a block diagram of a computer system which may utilize the present invention.

Referring now to FIG. 1, there is illustrated a computer system 10. The system 10 includes a central processing unit 11 which executes the various instructions provided to the computer system 10 to control its operations. The central processing unit 11 is joined to a bus 12 adapted to carry information to various components of the system 10. Joined to the bus 12 is main memory 13 which is typically constructed of dynamic random access memory arranged in a manner well known to those skilled in the prior art to store information during a period in which power is provided to the system 10. Also joined to the bus 12 is read only memory 14 which may include various memory devices well known to those skilled in the art each of which is adapted to retain a particular memory condition in the absence of power to the system 10. The read only memory 14 typically stores various basic functions used by the processor 11 such as basic input/output processes and startup processes typically referred to as BIOS processes.

Also connected to the bus 12 are various peripheral components such as long ten memory 16 and circuitry such as a frame buffer 17 to which data may be written which is to be transferred to an output device such as a monitor 18 for display. Rather than the typical electro-mechanical hard disk drive which is typically used for long ten memory, a flash EEPROM memory array may be used as the long ten memory 16. Such flash EEPROM memory arrays are programmed and erased through techniques which utilize voltages greater than those typically available to the integrated circuits of more advanced portable computers. Such flash EEPROM memory arrays may include circuitry for programming and erasing the memory array. Consequently, such long ten memory arrays may provide circuitry for generating higher voltages from the lower voltages provided by the batteries available in the portable computers in which such arrays are typically found. Such circuitry for generating high voltages may include charge pump circuitry adapted to utilize trains of clock pulses generated in accordance with the present invention.

A flash EEPROM memory array is made up of memory cells which include floating gate field effect transistor devices. Such memory transistors may be programmed to change the charge stored on the floating gate, and the condition (programmed or erased) may be detected by interrogating the cells. The conventional method of erasing an array of flash EEPROM memory cells erases all of the cells together (or at least some large block thereof). Typically, this requires the application of twelve volts to the source terminals of all of the memory cells, grounding the gate terminals, and floating the drain terminals. This conventional form of erasing flash EEPROM memory arrays is referred to as positive source erase.

In accordance with a newer negative erase technique, a large negative voltage (typically minus nine volts) is provided at the gate terminals of the memory devices; and Vcc (typically five volts) is provided at the source terminals. The five volts at the source terminal is not sufficient to break down the source-substrate junction diode of the memory device, and only a relatively insubstantial amount of source current flows in the erase process. Consequently, though similar voltage differentials are applied between the gate and source terminals of the device, the negative erase technique requires much less current from the charge pump.

Figure 2:
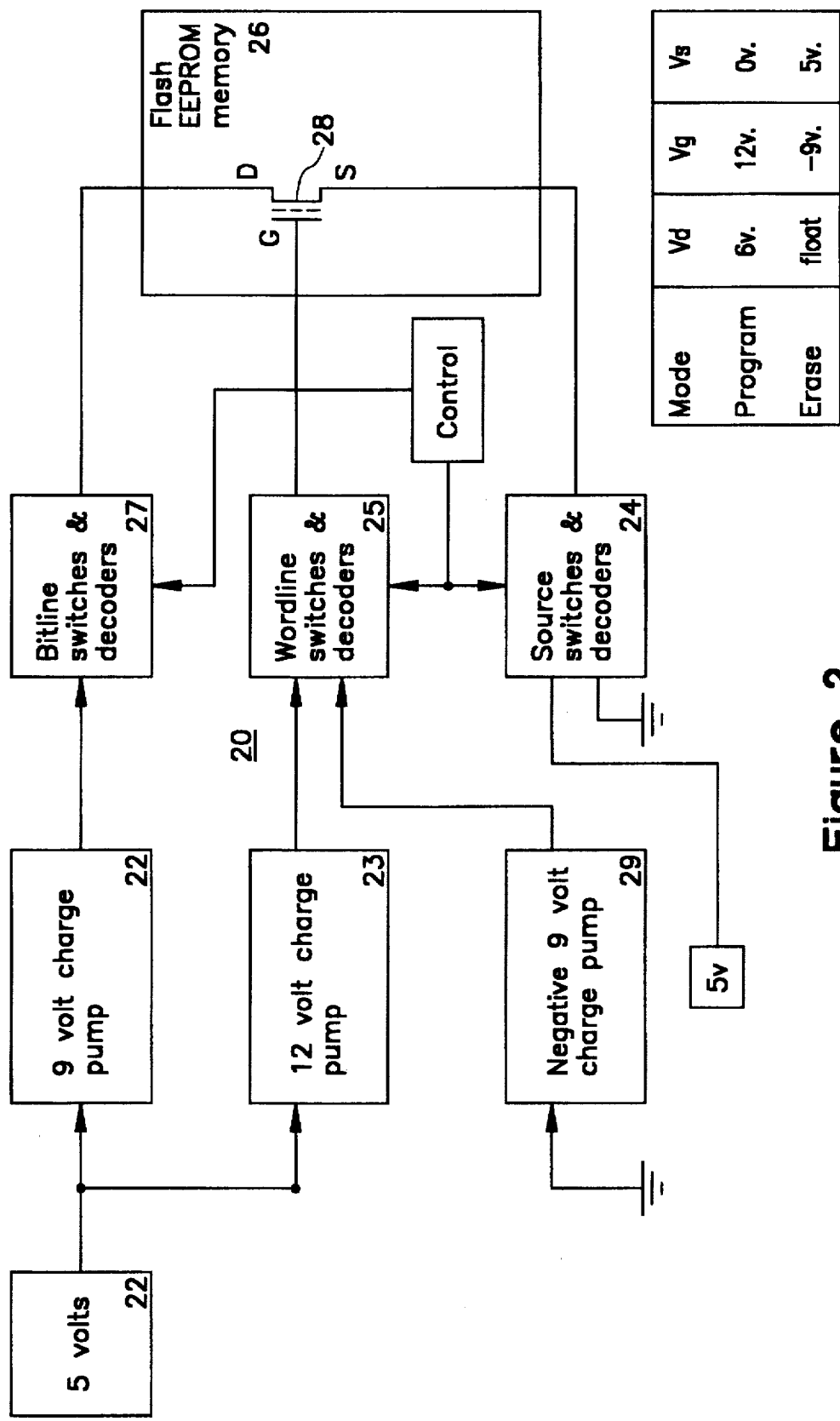
FIG. 2 is a block diagram of flash EEPROM memory array which may be a portion of the computer system of FIG. 1 and utilize the present invention.

FIG. 2 is a block diagram which illustrates a circuit 20 including a flash EEPROM memory array 26 and circuitry for programming and erasing the flash EEPROM memory army 26 using the negative erase technique in accordance with the present invention. This circuit 20 includes a source of voltage 21 such as a low powered battery capable of furnishing 5 volts. Voltage from the source 21 is provided to two charge pump circuits 22 and 23. Ground is provided as a source of voltage to a third negative charge pump 29. The charge pump circuit 22 is devised to provide a pumped output voltage of approximately 9 volts, the charge pump 23 is devised to produce a pumped output voltage of approximately 12 volts, and the charge pump 29 is devised to produce a pumped output voltage of approximately minus nine volts.

Voltage from the pump 23 is furnished to a set of wordline switches and decoders 25 which in a manner well known to those skilled in the art provide voltages to a wordline switch connected to the gate terminals of flash EEPROM memory transistors 28 (only one transistor 28 is illustrated). Voltage from the pump 29 is also furnished to the set of wordline switches and decoders 25 which provide voltages at the gate terminals of flash EEPROM memory transistors 28. The wordline switches and decoders select the voltage to be applied to the gate terminals of the memory transistors depending on whether the operation is programming or erasing. For example, the negative voltage provided by the charge pump 29 is applied to the gate terminals of the memory cells 28 during the erase operation. The voltage furnished by the charge pump 22 is furnished to a set of bitline switches and decoders 27 provide voltages at the drain terminals of flash EEPROM memory transistors 28 during programming. A third set of switches and decoders 24 apply ground or five volts to the source terminals of the memory cells 28. Each of the sets of switches and decoders 24, 25, and 27 may be controlled by signals from a control circuit to provide appropriate voltages at erase and programming to accomplish those results. In a preferred embodiment, the control circuit is a microprocessor designed to provide control of all of the operations of the memory array 26 including reading, programming, and erasing among other things. The use of such a control circuit is described in U.S. patent application Ser. No. 08/086,186, entitled *Flash Memory Array System And Method*, M. Fandrich et al, filed Jun. 30, 1993, and assigned to the assignee of the present invention. The control provided by the control circuit might be provided in other arrangements by some external source of control such as a central processing unit.

At the lower right corner of FIG. 2 is shown a table which includes the voltages which are applied to the various terminals of the memory cells during the program and erase operations using negative source erase techniques. As may be seen, the erasing of the memory device 28 requires that a positive five volts be applied to the source terminal of the device 28, minus nine volts be applied to the gate terminal, and the drain be floated.

In order to more efficiently generate the higher voltages desired for charge pumps generating either positive or negative voltage outputs, newer forms of charge pumps have been designed. One of these forms of charge pumps utilizes four individual trains of clock pulses in order to efficiently time the operations of the different stages.

Figure 3:
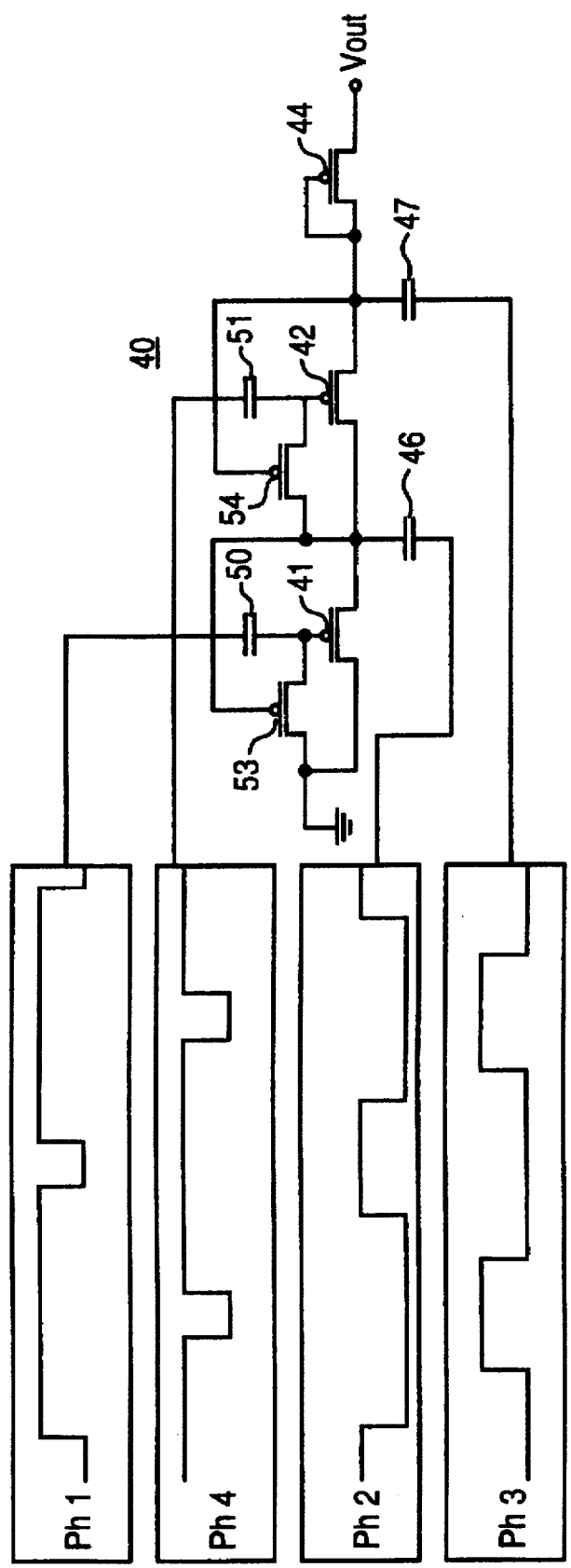
FIG. 3 is a circuit diagram of a charge pump which functions in response to generated using the present invention.

FIG. 3 illustrates a first bootstrap pump arrangement which may be utilized to provide the high negative voltages required for erasing flash EEPROM memory arrays in accordance with the negative erase technique using trains of clock pulses generated according to this invention. As will be apparent to those skilled in the art, a similar charge pump with P channel transistors replaced by N channel transistors and having a positive voltage input may be utilized to provide the high positive voltages for accomplishing positive source erase operations and other operations such as programming requiting positive output voltages. As is shown in FIG. 3, the pump 40 includes a number of stages of P type field effect transistors (FETs) 41, 42, and 44 connected in series between ground and an output terminal Vout. Input clock signals are furnished to the circuit 40 from sources illustrated via capacitors 46 and 47. A second set of input clock signals are furnished from sources illustrated by capacitors 50 and 51. Each stage of the circuit 40 includes a P channel field effect transistor device 53 or 54 used to precharge the gate terminal of the device 41 or 42 of that stage. The first stage is comprised of transistors 41 and 53 and capacitors 46 and 50.

The four individual clock signals referred to as phase 1, phase 2, phase 3, and phase 4 are shown in FIG. 3. Each of these clock signals provides a high value of Vcc and a low value of ground. In order to understand the operation of the circuit 40, the operation of a single stage including the transistor 42 will first be discussed. Following the timing diagram of FIG. 3, the phase 3 and phase 1 clocks are initially low. Since the phase 3 clock is low, the control device 54 is initially on. When the phase 2 clock signal goes low, the negative voltage pulse applied through the capacitor 46 charges the capacitor 51 at the gate terminal of the device 42 through the device 54 to the negative voltage level of the source terminal of the device 42. When the phase 3 clock then goes high, the device 54 turns off, isolating the gate of the device 42 and leaving the capacitor 51 charged to a negative level.

When the phase 4 clock then goes low, the voltage at the gate terminal of the device 42 is appreciably lower than the voltage at the source terminal because of the precharging of the capacitor 51 to a negative value. This turns the device 42 on in the region in which it experiences no threshold voltage (Vt) drop. The elimination of the Vt drop means that increased current is transferred more rapidly from the capacitor 46 to the next stage. The negative voltage phase 2 pulse at the capacitor 46 begins to charge the capacitor 47 (toward a value of minus Vcc).

When the phase 4 clock then goes high, the device 42 begins to go off. When the phase 2 clock goes low, the capacitor 47 goes to approximately minus two Vcc; and the device 54 turns on discharging the gate of the device 42 and bringing it toward the voltage of the drain so that the device 42 turns off rapidly. When the phase 2 clock then goes high, the device 42 stays off and the device 54 stays on so that the charge at the drain and gate terminals of the device 42 are equalized.

Viewing the circuit as a whole, when the device 41 comes on in response to the negative edge of the phase 1 clock, the capacitor 50 at its gate terminal has been placed at ground through the device 53 which has gone off. Thus, the gate terminal of the device 41 is forced much lower than the source terminal and the device 41 comes on without a Vt drop and charges the capacitor 46 and the capacitor 51 to ground level very rapidly. Then the device 41 begins to turn off as the phase 1 clock goes high. The drop of the phase 2 pulse causes the capacitor 46 to go to minus Vcc and completes the turnoff of the device 41 by discharging the capacitor 50 through the device 53. The low value phase 2 clock continues the charging of the capacitor 51 until the rise of the phase 3 clock turns off the device 54 leaving the gate of the device 42 charged. As explained above, the device 42 comes on completely without a Vt drop when the phase 4 clock goes low and the gate terminal of the device 42 which is charged to a negative value goes below the source terminal. This allows the rapid charge of the capacitor 47 to a negative value of approximately minus two times Vcc. The same sequence would continue through whatever number of stages are present until the charge on the capacitor 48 is sufficient to turn on the device 44 to provide a pumped voltage level at the output of the circuit 40. It should be noted that the device 44 operates in a range in which it exhibits a Vt drop since no bootstrap transistor is provided.

This basic operation continues in the manner explained. The two stage pump circuit 40 illustrated in FIG. 3 furnishes a negative voltage of approximately N (where N is the number of stages) times the pumped voltage Vcc at the output terminal less the Vt drop of the device 44. More importantly, the circuit 40 provides a very efficient operation because the circuit 40 does not have the threshold voltage drops of the usual charge pump circuit except for the last stage. This allows it to provide more current at the output and to do it more rapidly. This efficiency is a result of the bootstrapping operation by which the capacitors 50, 51, and 52 are charged and then the charging path is cut off so that the charge cannot dissipate before the devices 41, 42, and 43 are turned on. The charged gate terminal forces a higher voltage on the gate terminal than the drain terminal of each switching transistor when that switching transistor is turned on causing the transistor to function without a threshold voltage drop. This increased efficiency allows the charge pump to be implemented in fewer stages and therefore require less die area on an integrated circuit.

This form of operation requires very accurate clock pulses. As those skilled in the art will recognize, the four individual clock phases needed to operate the circuit 40 are very difficult to generate using prior art techniques. The clocks are of different lengths and must be accurately timed in order to provide the appropriate operation of the circuit to obtain its advantageous results.

Figure 4:
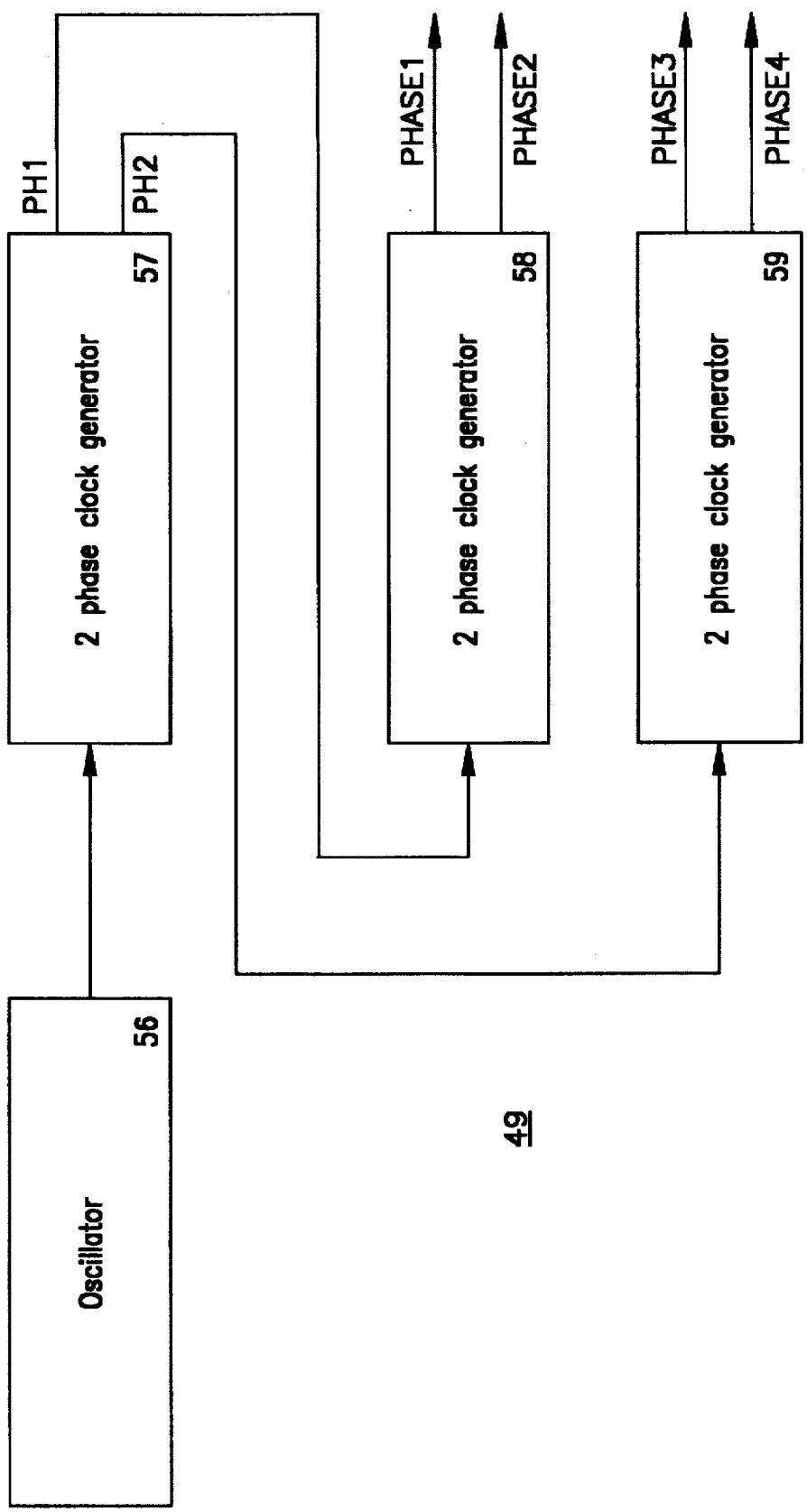
FIG. 4 is a block diagram illustrating a circuit for generating four trains of non-overlapping clock pulses in accordance with the present invention.

Referring now to FIG. 4, there is illustrated in block diagram form a circuit 49 in accordance with the present invention for generating four non-overlapping trains of clock pulses which may be used to operate a charge pump such as that described above. The four non-overlapping trains of clock pulses consist of two sets of two non-overlapping clocks. Each set of non-overlapping trains of clocks are non-overlapping in the non-active clock time, or in this case, during the "low" clock period. The clock trains are not simply inverting clocks, and therefore each set of clock trains overlap during a portion of the active clock time, or in this case, during a portion of the "high" clock period, as shown in FIGS. 3 and 4. The circuit 49 includes an oscillator 56 for generating a first train of clock pulses CLK. The clock pulses CLK furnished by the oscillator 56 are directed to a first circuit 57 which generates two trains of non-overlapping and opposite phase clock pulses illustrated as PHI1 and PHI2. The train of opposite phase clock pulses PHI1 is individually furnished to a second circuit 58 which generates two more trains of non-overlapping and opposite phase clock pulses PHASE1 and PHASE2. The train of clock pulses PHI2 from the first circuit 57 is individually furnished to a third circuit 59 which generates two additional trains of non-overlapping and opposite phase clock pulses PHASE3 and PHASE4. The result is four trains of clock pulses which may be utilized to drive a charge pump such as that illustrated above. It will be noted that the negative-going pulses of PHASE1 and PHASE2 are non-overlapping. Similarly, that the negative-going pulses of PHASE3 and PHASE4 are non-overlapping. Further, it will be noted that PHASE1 and PHASE4 are also non-overlapping clocks in the non-active "low" clock time, but PHASE2 and PHASE3 are non-overlapping clocks in the active "high" clock time. Thus, these trains of pulses will function in the manner described above to operate a charge pump such as that illustrated In FIG. 3.

Figure 5:
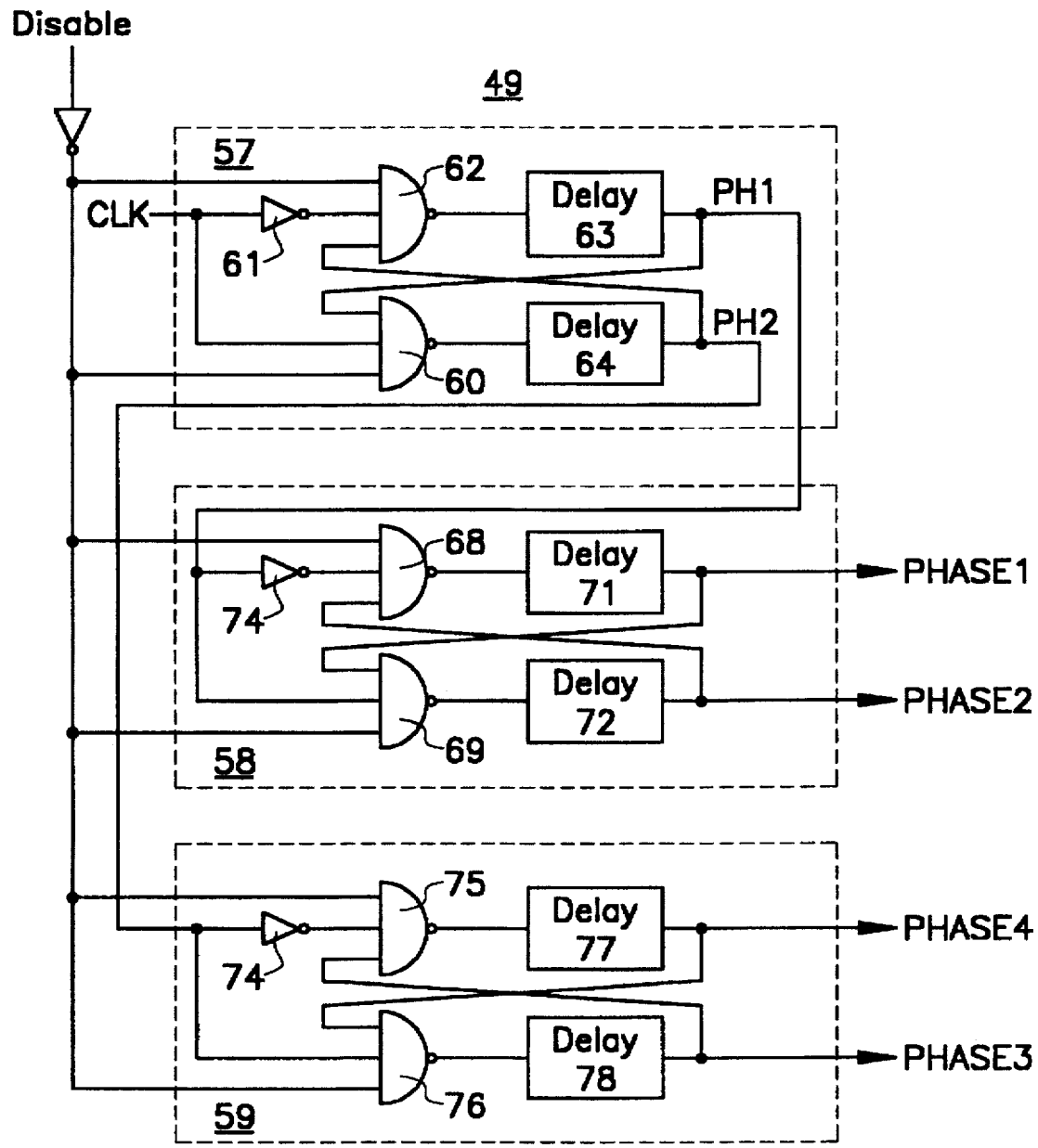
FIG. 5 is a more detailed block diagram illustrating a circuit for generating four trains of non-overlapping clock pulses in accordance with the present invention.
Figure 6:
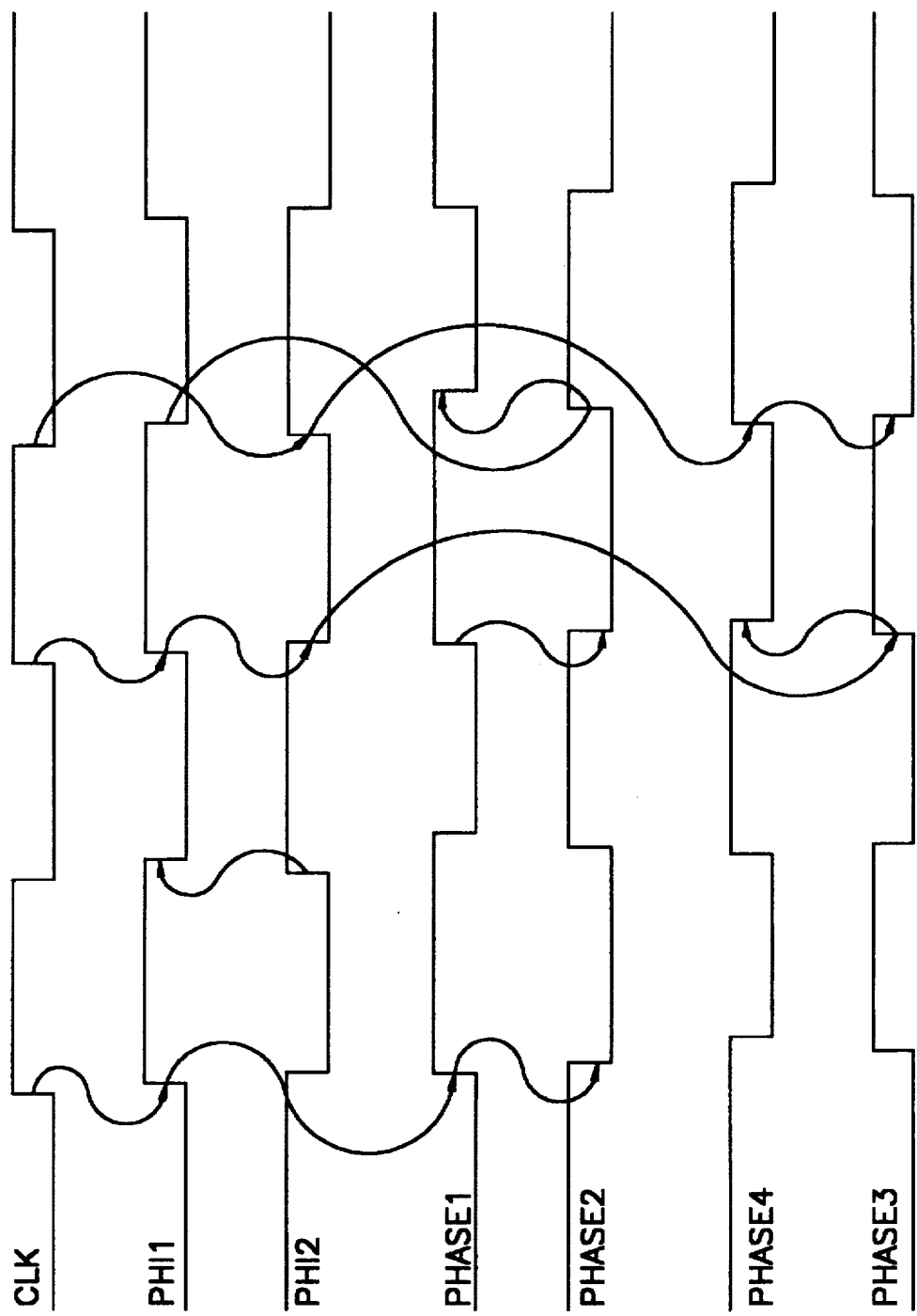
FIG. 6 is a series of timing diagrams illustrating signals generated in practicing the present invention.

FIG. 5 illustrates a particular embodiment of the circuit 49 of FIG. 4 for generating clock pulses. FIG. 6 illustrates the waveforms produced by the circuit 49 and should be followed during this explanation for a better understanding of the invention. The circuit 57 illustrated receives the clock pulses CLK produced by the oscillator 56 of the circuit 49 at a first input terminal. The clock pulses CLK are furnished to a first NAND gate 60 as one of three input signals. The clock pulses CLK are also inverted by an inverter 61 and furnished to a second NAND gate 62 as one of three input signals. When the clock signal CLK goes high, the clock signal is provided as a high valued (one) input to the NAND gate 60. Simultaneously, the inverter 61 provides a low valued (zero) output as one input to the NAND gate 62. A NAND gate produces a zero valued output when all input signals are ones and a one valued output for all other cases. Consequently, the NAND gate 62 provides a one valued output signal. The output of the NAND gate 62 is delayed by a delay element 63 and provided as the output which is the PH1 clock. The PH1 clock signal is routed back to the input of the NAND gate 60. The NAND gates 60 and 62 and all other NAND gates described in this FIG. 6 each receive a constant high valued signal generated by an inverter connected to a disable input terminal except in the case where a disable signal is provided to the circuit. Consequently, the NAND gate 60 responds to the one valued clock signal CLK, the one valued PH1 signal routed back to it, and the one valued disable# signal to generate a low valued output signal. This zero valued signal is delayed by a delay element 64 and provided as the PH2 output signal. The PH2 output signal is routed back to NAND gate 62 where its low value causes no change in the generation of the one valued PH1 output signal from the delay element 63.

When the input clock signal CLK reverses polarity, a one valued input is transferred by the inverter 61 to the NAND gate 62. Since the PH2 signal remains a zero, the output of the NAND gate 62 initially remains high. However, the zero valued input to the NAND gate 60 reverses the output of the NAND gate 60 to a high value. This is delayed by the delay element 64 and transferred to the output as a rising edge of the PH2 signal. The one valued PH2 signal is routed back to the input of the NAND gate 62. The three one valued input signals cause the NAND gate 62 to generate a zero valued output which is delayed by the delay element 63 and transferred as a falling edge of the PH1 signal train.

This process continues as the signal CLK is furnished to the circuit 57. The result of this is that two negative-going trains of clock pulses are produced which are essentially opposite in phase. The length of the individual pulses in the two trains of negative-going pulses are adjusted according to the desired characteristics needed by adjusting the delay provided by the delay elements 63 and 64.

The PH1 train of clock pulses is furnished as an input signal to a second two phase clock generator circuit 58. The circuit 58 includes an inverter 67, a pair of NAND gates 68 and 69, and delay elements 71 and 72 chosen to set the non-overlap duration. Like the circuit 57 including the NAND gates 60 and 62, this second two phase clock generator circuit 58 provides a pair of trains of opposite phase negative-going clock pulses PHASE1 and PHASE2 which are supplied to the capacitors 46 and 47 of the circuit 40.

The PH2 train of clock pulses is furnished as an input signal to a third two-phase clock generator circuit 59 including an inverter 74, a pair of NAND gates 75 and 76, and delay elements 77 and 78 chosen to set the period of non-overlap. Like the circuit 57 including the NAND gates 60 and 62, this third two-phase clock generator circuit 59 provides a pair of trains of non-overlapping negative going clock pulses PHASE3 and PHASE4 which are supplied to the capacitors 50 and 51 of the circuit 49. It will be noted that the negative-going pulses of PHASE1 and PHASE4 are non-overlapping. Similarly, that the negative-going pulses of PHASE2 and PHASE3 are non-overlapping. Thus, these trains of pulses will function in the manner described above to operate a charge pump such as that illustrated In FIG. 3. In fact, the shape and length of the pulses produced in each train may be easily adjusted to provide exactly the desired characteristics for operating a charge pump such as that illustrated In FIG. 3 by adjusting the delays provided by each of the delay elements 63, 64, 71, 72, 77, and 78.

In this manner, four individual trains of non-overlapping clock pulses PHASE1, PHASE2, PHASE3, and PHASE4 which may be used to operate a charge pump like that illustrated in FIG. 3 are produced simply and precisely. It will be noted by those skilled in the art that the essence of the invention may be practiced by sets of circuits each of which produces a pair of non-overlapping clock pulses from a single input clock pulse. Thus, varieties of gates and delay elements other than those specifically illustrated in FIG. 5 may be used to obtain this result. As will be clear, clock pulses generated in accordance with the present invention may be used for driving either positive or negative charge pump circuits.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A clock generation circuit comprising:
    a first circuit for generating a first train and a second train of non-overlapping and opposite phase clock pulses from an input train of clock pulses;
    a second circuit for generating a third train and a fourth train of non-overlapping and opposite phase clock pulses from the first train of clock pulses generated by the first circuit; and
    a third circuit for generating a fifth train and a sixth train of non-overlapping and opposite phase clock pulses from the second train of clock pulses generated by the first circuit, wherein the third train of clock pulses and the fifth train of clock pulses are non-overlapping phase clock pulses.

2. A clock generation circuit as claimed in claim 1 where the non-overlapping phase clock pulses are non-overlapping during a first time of the clock pulses and are overlapping during a second time of the clock pulses.

3. A clock generation circuit as claimed in claim 2 in which the first, second, and third circuits each comprise first and second NAND gates, conductors for providing the input train of clock pulses to the first NAND gate and the inverted input train of clock pulses to the second NAND gate, and circuitry for providing the output of each NAND gate to the input of the other NAND gate through a delay circuit.

4. A clock generation circuit as claimed in claim 3 in which the width of individual pulses of each of the trains of clock pulses may be varied by varying a delay provided by each of the delay circuits.

5. A charge pump circuit comprising
    a charge pump having a plurality of stages,
    each of the stages including a first transistor device adapted to transfer charge between stages,
    a second transistor device adapted to precharge an input terminal of the first transistor device, and
    an interstage capacitor for storing charge transferred by the first transistor device; and
    a clock generation circuit comprising:
        a first circuit for generating a first train and a second train of non-overlapping and opposite phase clock pulses from an input train of clock pulses;
        a second circuit for generating a third train and a fourth train of non-overlapping and opposite phase clock pulses from the first train of clock pulses generated by the first circuit; and a third circuit for generating a fifth train and a sixth train of non-overlapping and opposite phase clock pulses from the second train of clock pulses generated by the first circuit, where the third train of clock pulses and the fifth train of clock pulses are non-overlapping phase clock pulses.

6. A clock generation circuit as claimed in claim 5 where the non-overlapping phase clock pulses are non-overlapping during a first time of the clock pulses and are overlapping during a second time of the clock pulses.

7. A computer system comprising:

a central processor;

a system bus;

main memory; and programmable non-volatile long term storage including:
a flash EEPROM memory array, and
a charge pump circuit for furnishing voltages for operating the flash EEPROM memory array comprising:
a charge pump having a plurality of stages,
each of the stages including a first transistor device adapted to transfer charge between stages,
a second transistor device adapted to precharge an input terminal of the first transistor device, and
an interstage capacitor for storing charge transferred by the first transistor device; and
a clock generation circuit comprising
a first circuit for generating a first train and a second train of non-overlapping and opposite phase clock pulses from an input train of clock pulses;
a second circuit for generating a third train and a fourth train of non-overlapping and opposite phase clock pulses from the first train of clock pulses generated by the first circuit; and
a third circuit for generating a fifth train and a sixth train of non-overlapping and opposite phase clock pulses from the second train of clock pulses generated by the first circuit, where the third train of clock pulses and the fifth train of clock pulses are non-overlapping phase clock pulses.

8. A computer system as claimed in claim 7 in which the non-overlapping phase clock pulses are non-overlapping during a first time of the clock pulses and are overlapping during a second time of the clock pulses.

9. A clock generation circuit comprising a first means for generating a first train and a second train of non-overlapping and opposite phase clock pulses from an input train of clock pulses;

a second means for generating a third train and a fourth train of non-overlapping and opposite phase clock pulses from the first train of clock pulses generated by the first means; and a third means for generating a fifth train and a sixth train of non-overlapping and opposite phase clock pulses from the second train of clock pulses generated by the first means, where the third train of clock pulses and the fifth train of clock pulses are non-overlapping phase clock pulses.

10. A clock generation circuit as claimed in claim 9 in which the non-overlapping phase clock pulses are non-overlapping during a first time of the clock pulses and are overlapping during a second time of the clock pulses.

11. A charge pump circuit comprising charge pump means having a plurality of stages,
each of the stages including a first transistor means adapted to transfer charge between stages,
a second transistor means adapted to precharge an input terminal of the first transistor means, and
interstage means for storing charge transferred by the first transistor means; and
a clock generation circuit comprising
a first means for generating a first train and a second train of non-overlapping and opposite phase clock pulses from an input train of clock pulses;
a second means for generating a third train and a fourth train of non-overlapping and opposite phase clock pulses from the first train of clock pulses generated by the first means; and
a third means for generating a fifth train and a sixth train of non-overlapping and opposite phase clock pulses from the second train of clock pulses generated by the first means, where the third train of clock pulses and the fifth train of clock pulses are non-overlapping phase clock pulses.

12. A charge pump circuit as claimed in claim 11 in which the non-overlapping phase clock pulses are non-overlapping during a first time of the clock pulses and are overlapping during a second time of the clock pulses.

13. A computer system comprising:

central processing means;

bus means;

main memory means; and means for providing programmable non-volatile long term storage, the last mentioned means including:
flash EEPROM memory array means, and
a charge pump circuit for furnishing voltages for operating the flash EEPROM memory array comprising:
charge pump means having a plurality of stages,
each of the stages including a first transistor means adapted to transfer charge between stages,
a second transistor means adapted to precharge an input terminal of the first transistor means, and
interstage means for storing charge transferred by the first transistor means; and
a clock generation circuit comprising
a first means for generating a first train and a second train of non-overlapping and opposite phase clock pulses from an input train of clock pulses;
a second means for generating a third train and a fourth train of non-overlapping and opposite phase clock pulses from the first train of clock pulses generated by the first means; and
a third means for generating a fifth train and a sixth train of non-overlapping and opposite phase clock pulses from the second train of clock pulses generated by the first means, where the third train of clock pulses and the fifth train of clock pulses are non-overlapping phase clock pulses.

14. A computer system as claimed in claim 13 in which the non-overlapping phase clock pulses are non-overlapping during a first time of the clock pulses and are overlapping during a second time of the clock pulses.

15. A method for generating clock pulses comprising the steps of:

generating a first train and a second train of non-overlapping and opposite phase clock pulses from an input train of clock pulses;

generating a third train and a fourth train of non-overlapping and opposite phase clock pulses from the first train of clock pulses; and generating a fifth train and a sixth train of non-overlapping and opposite phase clock pulses from the second train of clock pulses, where the third train of clock pulses and the fifth train of clock pulses are non-overlapping phase clock pulses.

16. A method for generating clock pulses as claimed in claim 15 in which the non-overlapping phase clock pulses are non-overlapping during a first time of the clock pulses and are overlapping during a second time of the clock pulses.

* * * * *